(No Model.)  
2 Sheets—Sheet 1.
M. V. SMITH.
STEAM BOILER FURNACE.
No. 424,829. Patented Apr. 1, 1890.
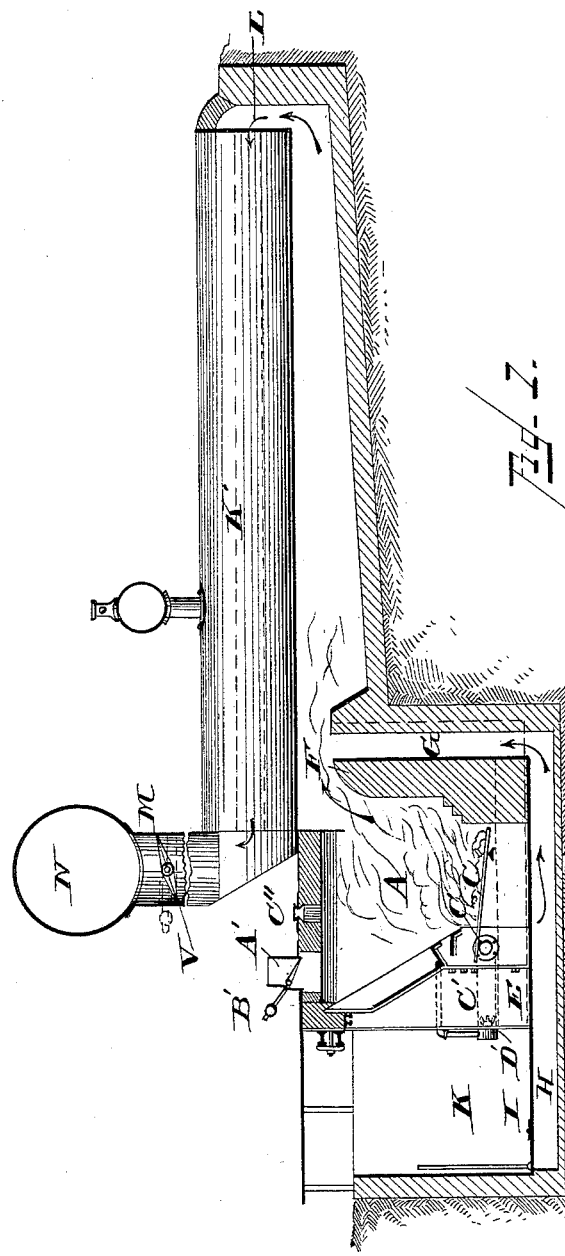
WITNESSES  
F. L. Durand  
H. M. Sterling  
INVENTOR  
Martin V. Smith  
By  
L. M. Ginsabaugh  
Attorney

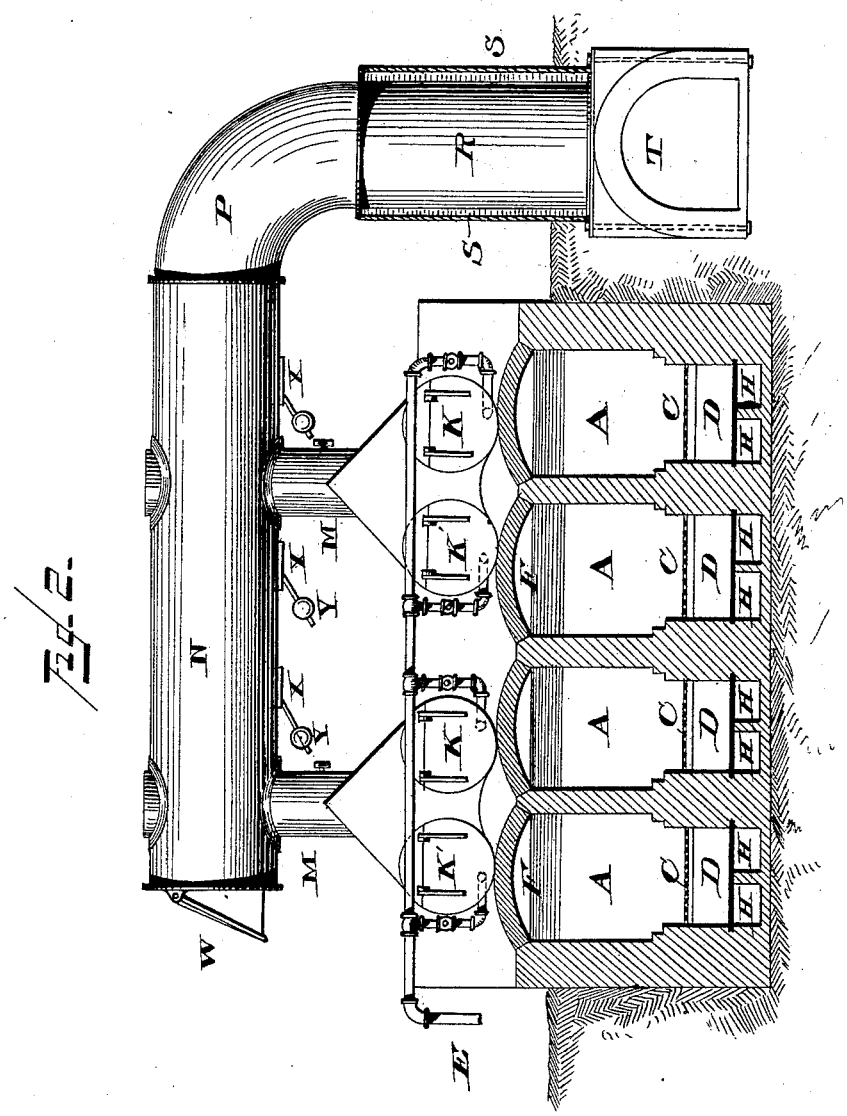

UNITED STATES PATENT OFFICE.

MARTIN V. SMITH, OF PITTSBURG, PENNSYLVANIA, ASSIGNOR TO THE PITTSBURGH METALLURGY COMPANY, OF SAME PLACE.

STEAM-BOILER FURNACE.

SPECIFICATION forming part of Letters Patent No. 424,829, dated April 1, 1890.

Application filed July 8, 1889. Serial No. 316,867. (No model.)

*To all whom it may concern:*

Be it known that I, MARTIN V. SMITH, a citizen of the United States, residing at Pittsburg, in the county of Allegheny and State of Pennsylvania, have invented new and useful Improvements in Steam-Boiler Furnaces; and I do hereby declare the following to be a full, clear, and exact description of said invention, reference being had to the accompanying drawings, and to the letters of reference marked thereon, which form a part of this specification.

This invention relates to certain improvements in steam-boiler furnaces; and it has for its objects, first, to initially produce in the furnace combustible gases, and to utilize the heat of the hot gases as generated to heat a boiler or battery of boilers; second, to partially consume the gases generated in the furnace to intensify the heat thereof, and utilizing the partly-consumed gases in heating the boilers for the generation of steam; third, to condense the water resulting from the oxidation of the hydrogen of the partially-consumed gases, and eliminate the water resulting from such condensation from the partly-consumed gases, so as to leave the gases in condition to be subsequently used for fuel, manufacturing, and other purposes, all as more fully hereinafter described.

In practicing my invention, ignited coke or other carbonaceous material is subjected to the action of the air until the whole body is rendered incandescent. Then a current or series of jets of steam, in connection with an induced current of air, is passed up through the incandescent mass, producing a large volume of intensely-heated combustible gases, consisting, mainly, of hydrogen and carbonic oxide, mixed, however, with a small percentage of carbonic acid and the nitrogen of the air introduced, which act simply as diluents of the combustible gases. These hot gases are initially employed to heat the boilers of the furnace, so as to utilize the heat employed in their production; and, to intensify the heat and render the boiler-furnace more efficient for the generation of steam, a percentage of the combustible gases may be consumed under the boilers, say, to the extent of fifty per cent. thereof, which will furnish all the necessary heat required, leaving fifty per cent. of combustible gases in the escaping products of combustion, combined with the watery vapor resulting from the condensation of the water, carbonic oxide, and hydrogen to be run off and subsequently used for manufacturing and other suitable purposes. Previously, however, to using the gases thus passing off it is necessary to separate the water resulting from the oxidation of the hydrogen therefrom, and this is accomplished by cooling the gases to a temperature below 212° Fahrenheit and trapping off the condensed water.

In the accompanying drawings, forming part of the specification, Figure 1 represents a longitudinal sectional view of a furnace embodying my invention, showing a longitudinal side elevation of a return-flue boiler in connection therewith and a cross-section of a tube or pipe through which the unconsumed gases pass off. Fig. 2 represents a cross-section of a series of furnaces, a front elevation of a battery of boilers located above said furnaces, a front elevation of the flue through which the unconsumed gases pass an elevation of the condenser, and a cross-section of a main through which the gases are carried off.

Referring to the drawings, the letter A indicates the producer or generating-chamber of a furnace constructed according to the present invention. The said furnace is provided with the usual grate C, ash-pit D, and draft-doors E, through which air is supplied to initially support the combustion of the fuel.

The letter F indicates the fire-bridge of the furnace, which is provided with a vertical flue G, leading from the horizontal flues H, which communicate by means of openings I with the working-pit K, through which air may be supplied to the gases escaping from the producer to support the combustion of a portion of the gases and to assist in heating the boiler.

The letter K', Figs. 1 and 2, indicate boilers of the ordinary return-flue variety, located over the rear of the furnace above and back of the fire-bridge. The flues of said boilers at the rear communicate with the rear of the furnace by means of the vertical flues L, and at the fronts of the boilers, connecting with the flues thereof, are air pipes or flues M, which connect with an eduction-flue N, through which the unconsumed gases escape. The said pipe or flue N connects by an elbow-pipe P with a vertical flue R, which is surrounded by a water-jacket S, through which a stream of water may be kept flowing in any suitable manner, in order to cool the gases passing off to a temperature below 212° Fahrenheit, and to condense the water resulting from the oxidation of the hydrogen to separate it from the gases. The lower end of the flues R connects with a main T, through which the unconsumed gases are finally passed off for use.

In the vertical pipes M are located dampers V, by means of which the connection between the flues of the boilers and the eduction-flue may be opened or closed at will. The front end of the eduction-flue N is provided with a puff-valve W, Fig. 2, and at intermediate points the flue is also provided with puff-valves X, having weighted levers Y, which permit them to open automatically upon any sudden puff or extra pressure of gas and close automatically upon the relief of the pressure.

Each furnace at its top above the producer is provided with a fuel-conduit A', having a balanced damper B', by means of which fuel may be supplied when required. The top of the furnace is also provided with a stoke-hole C', through which the fuel may be manipulated by means of a suitable bar. Through the front of each of the furnaces, below the grate-bars thereof, extends a pipe or flue C', which connects at its outer end with the external air and terminates at its inner end within the furnace below the grate thereof. Into the outer end of the said pipe or flue C' extends a steam-injector or series of steam-injectors D', which receive a supply of steam through the pipes E', leading from the boiler, so as to permit a regulated supply of steam to be discharged into the furnace under the grate thereof, as and for the purpose more fully hereinafter explained.

The operation of my invention is as follows: The boiler is filled with water to or above the usual fire-line, and the producer or generator is suitably charged with coke or other suitable carbonaceous material. The fuel is then ignited, the draft-doors being opened to admit the air for the support of the combustion of the fuel. The air thus admitted passes up through the coke, the products of combustion passing back under the boiler, through the flues in the boiler, automatically opening the puff-doors and escaping. When the coke becomes thoroughly incandescent, the draft-doors are closed, and steam is admitted through the jet-pipes which enter the flue, the jets inducing a current of air which is carried into the furnace below the grate-bars, and with the steam passes up through the incandescent fuel in the producer. Fresh coal may now be added through the hopper A'. If it is desired to take the products of combustion from under the boiler, together with the unconsumed or unoxidized gases, the puff-door W is closed and the gas passed through the meter N and condenser R into the main T, leading the final gases to their place of storage or consumption.

By means of the improved boiler-furnace above described it will be readily understood that the heat initially used in producing the gas is utilized in the generation of steam; but that any additional degree of heat may be supplied to the boilers and all unconsumed gases saved and used subsequently.

As the producer-gas expands to double its volume for every five hundred degrees of heat, it follows that one volume of gas at ordinary atmospheric temperature would expand to four volumes at two thousand degrees of heat. It will be readily perceived, therefore, that by cooling the gases the water is not only condensed and separated, but the gases are also condensed, so as to render one cubic foot of cold gas equal to four feet of the expanded gas in heating capacity, while reducing the storage capacity necessary when keeping the gas to a similar degree.

In an application filed of even date herewith, Serial No. 316,866, I have claimed the method of burning fuel, and such I do not claim in this application.

Having thus described my invention, what I claim, and desire to secure by Letters Patent, is—

1. The combination, in a boiler-furnace, of the producer or gas-generating chamber, an exit-flue leading therefrom, and an eduction-flue having a puff-valve, whereby the products of combustion may be passed off while the fuel is being initially heated in the producer or generating-chamber, substantially as specified.

2. The combination, in a boiler-furnace of the character described, of the producer, the boiler, and eduction-pipe provided with a puff-door at one end, substantially as and for the purpose specified.

3. In a boiler-furnace of the character described, the combination, with the eduction-flue, of a series of balanced puff-valves, whereby the apparatus may be automatically relieved of any sudden pressure, substantially as specified.

In testimony whereof I affix my signature in the presence of two subscribing witnesses.

MARTIN V. SMITH.

Witnesses:
JNO. C. CUTHBERT,
ARTHUR VON SENDEN.